United States Patent [19]
Satoh et al.

[11] Patent Number: 6,144,272
[45] Date of Patent: Nov. 7, 2000

[54] INHIBITOR SWITCH HAVING CONTACT SECTIONS FORMED WITH MAGNETIC SENSORS AND PERMANENT MAGNETS

[75] Inventors: Shunichi Satoh; Shinya Nakamura; Tetsuya Tomotoshi, all of Tokyo, Japan

[73] Assignee: Niles Parts Co., Ltd., Tokyo, Japan

[21] Appl. No.: 09/386,193

[22] Filed: Aug. 30, 1999

[30] Foreign Application Priority Data

Aug. 31, 1998 [JP] Japan .................................. 10-260911

[51] Int. Cl.$^7$ ...................................................... H01H 9/00
[52] U.S. Cl. ........................................ 335/207; 200/11 R
[58] Field of Search .................................. 335/205–207; 200/11 A, 11 D, 11 R, 61.88, 61.91, 61.96

[56] References Cited

U.S. PATENT DOCUMENTS

| | | | |
|---|---|---|---|
| 4,212,000 | 7/1980 | Yamada | 200/11 R |
| 4,519,266 | 5/1985 | Reinecke | 74/471 |
| 5,440,087 | 8/1995 | Cobb, III | 200/61.88 |
| 5,811,747 | 9/1998 | Taniguchi et al. | 200/61.88 |
| 5,867,092 | 2/1999 | Vogt | 340/456 |
| 5,969,313 | 10/1999 | Ikeshima et al. | 200/61.88 |

FOREIGN PATENT DOCUMENTS 59-146222   9/1984   Japan .

*Primary Examiner*—Lincoln Donovan
*Attorney, Agent, or Firm*—Ronald P. Kananen; Rader, Fishman & Grauer

[57] ABSTRACT

An inhibiter switch is provided with a movable body 1 rotatable in accordance with an operating position of an automatic transmission device. The movable body 1 is supported rotatably by a cover 2 and a pole base 3 having magnetic sensors 9 disposed therein. A conductive body having a terminal 7b projected into a connector section 3c at one side thereof and a body section 7a electrically connected to the magnetic sensors 9 and exposed from a bottom surface 3d, is insert molded into the pole base 3. The pole base 3 forms an offset surface 3e exposing the body section 7a as a connection location with the conductive body 7 from the bottom surface 3d. The pole base 3 has notches 3f, 3g, 3h in which the magnetic sensors 9 are disposed, and a notch 3i in which a substrate 6 is disposed. The notches 3f, 3g, 3h, 3i are formed at the periphery of the offset surface 3e. The pole base 3 also forms a guide 3j for disposing the magnetic sensors 9 within the offset surface 3e. The inhibitor switch with this construction has contact sections formed with magnetic sensors, resulting in a low manufacturing cost and a high operating precision.

9 Claims, 5 Drawing Sheets

6,144,272

INHIBITOR SWITCH HAVING CONTACT SECTIONS FORMED WITH MAGNETIC SENSORS AND PERMANENT MAGNETS

RELATED APPLICATIONS

The subject matter of this application is related to the subject matter of the Applicants' copending application Ser. No. 09/386,002 filed Aug. 30, 1999, and Ser. No. 09/386,194 filed Aug. 30, 1999.

BACKGROUND OF THE INVENTION

1. Field of the Invention

The present invention relates generally to a structure of an inhibitor switch for switching contacts in accordance with transmission operating positions of an automatic transmission device used for automobiles. In particular, the present invention relates to an improvement of a pole base of the inhibitor switch in which the contact sections are constructed with magnetic sensors and permanent magnets.

2. Description of the Related Art

A conventional inhibitor switch is disclosed, for example, in Japanese Utility Model Publication Laid-Open No. 59-146222. This conventional inhibitor switch has a permanent magnet fitted in a lever by using adhesive. A printed substrate provided with a magnetic flux detecting element is molded in a main body through an insert molding method.

In this conventional inhibitor switch, the printed substrate is fixed on a pole base and has a low precision of dimension. As a result, the position of the magnetic flux detecting element is deviated, thereby resulting in an insufficient precision for the operation of the switch.

SUMMARY OF THE INVENTION

It is an object of the present invention to provide an inhibitor switch that solves the problems found in the conventional inhibitor switch described above.

More specifically, it is an object of the present invention to provide an inhibitor switch with a high precision for the contact sections thereof.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

In accordance with the present invention, in order to achieve the objects set forth above, an inhibitor switch is provided, comprising: a movable base provided with permanent magnets and adapted to be rotated in accordance with the transmission operating position of an automatic transmission device, magnetic sensors for detecting the magnetic flux from the permanent magnets, a pole base rotatably supporting the movable base, and a cover for rotatably supporting the movable base. The inhibitor switch is characterized in that a conductive body composed of terminals projected into a connector section and a body section connected to the magnetic sensors mounted within the pole base is mounted on the bottom surface of the pole base, and the conductive body is inserted into the pole base by using an insert molding method.

The inhibitor switch of the present invention has several additional features that provide improvements over the prior art. For example, the pole base has an offset surface which is slightly recessed from the bottom surface, and the conductive body is inserted into the offset surface by using an insert molding method. The pole base is provided with notches for disposing the magnetic sensors or a substrate at the periphery of the offset surface. The pole base is provided with a guide for disposing the magnetic sensors within the offset surface. The lead terminal of the magnetic sensor is folded and then the magnetic sensors are disposed in the laterally opposite direction, and the upper surface of the magnetic sensors is approximately aligned with the bottom surface of the pole base.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE INVENTION

Figure 1:
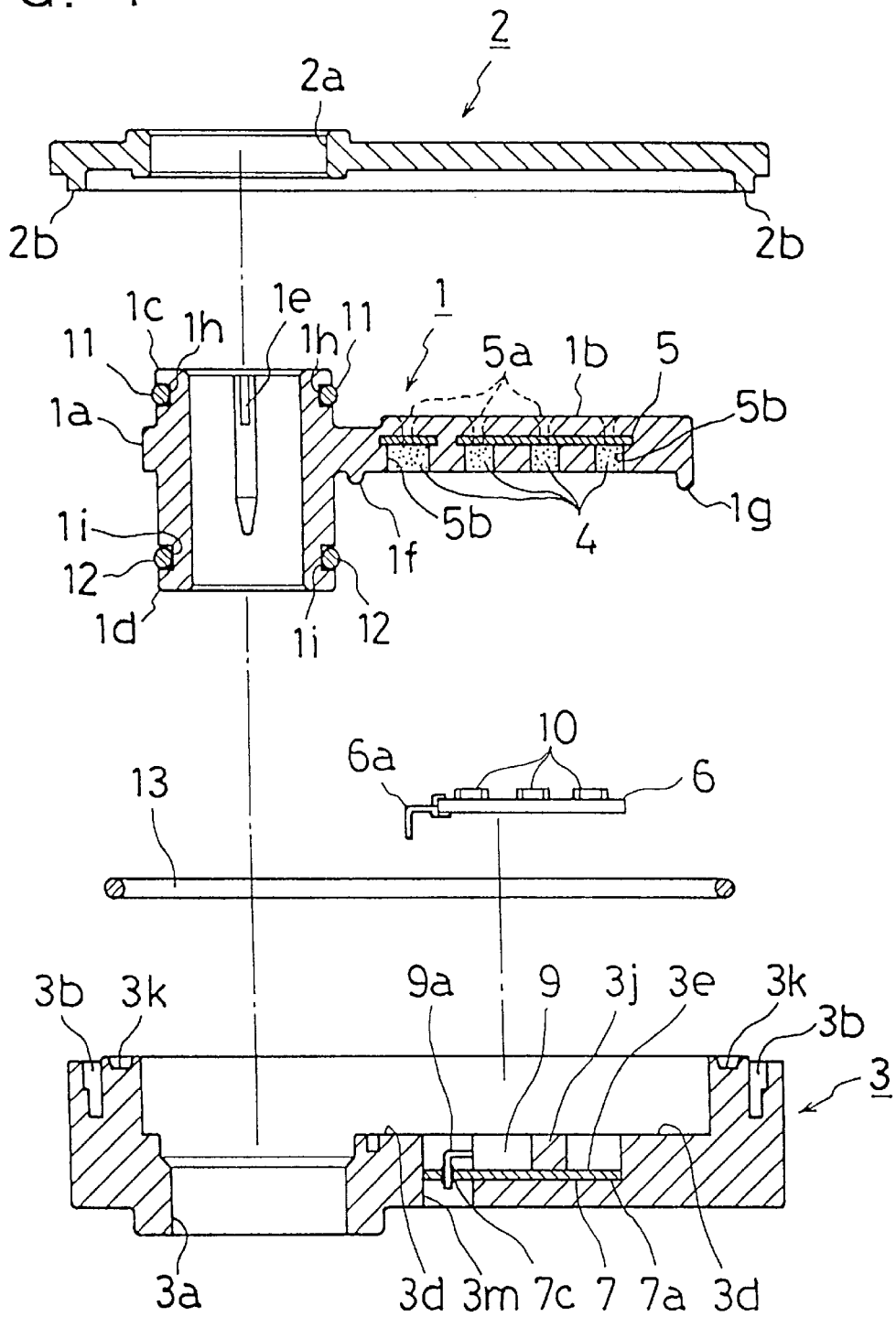
FIG. 1 is an exploded sectional view of an inhibitor switch according to the preferred embodiment of the present invention.

An inhibitor switch according to a preferred embodiment of the present invention will now be described in detail with reference to FIGS. 1 to 7 of the accompanying drawings.

A movable base 1 is provided in which a cylindrical section 1a to be fitted on a transmission lever shaft (not shown) of an automatic transmission device is integrally formed with a movable arm 1b having permanent magnets 4 and yokes 5. The movable base 1 is rotatably held within the space formed by a cover 2 and a pole base 3 in such manner that an upper shaft section 1c of the cylindrical section 1a is pivoted on the shaft hole 2a of the cover 2, and a lower shaft section 1d of the cylindrical section 1a is pivoted on a shaft hole 3a of the pole base 3. Moreover, the cylindrical section 1a may be replaced by the transmission lever shaft directly or a shaft (not shown) indirectly coupled to the transmission lever shaft mentioned above.

Figure 3:
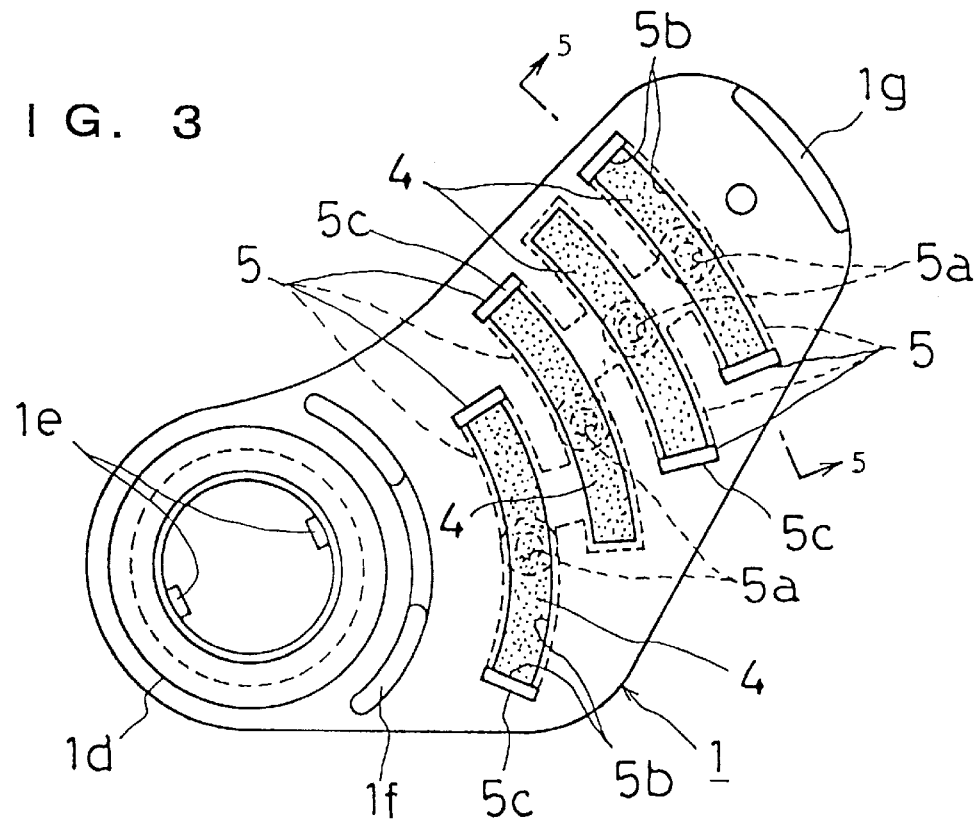
FIG. 3 is an enlarged view showing a bottom of a movable base of the inhibitor switch according to the preferred embodiment of the present invention.

The yoke 5 is formed as shown in FIGS. 1 and 3 in which four arc-shaped and L-shaped iron plats are connected with each other integrally, and there are formed gate holes 5a at approximately the center portion of four bottom surfaces, respectively. The yoke 5 integrally formed on the movable base 1 may be omitted. The method for mounting the permanent magnets 4 on the movable base 1, and further the material and kind of the permanent magnets 4 are not limited.

In manufacturing the movable base 1, pins (not shown) are at first inserted into the gate holes 5a, respectively, and then the yokes 5 are molded with resin by using an insert molding method. The yoke 5 and the movable base 1 form a primary molded product made by using the insert molding method. The portion of the movable base 1 at which the bottom pieces 5b are exposed is made as a hollowed portion. Then, the primary molded product is set on a metal mold used for forming the permanent magnet. Then, the mixture of neodymium powder (magnetic material) and PPS pellets, which forms a bonded magnetic material or a plastic magnet, is injected into the hollowed portion of the yoke 5, thereby forming the permanent magnet 4 as a secondary molding product. Thus, the manufacture of the movable base 1 is finished.

Since the gate hole 5a is provided at approximately the center portion of each permanent magnet 4, each permanent magnet 4 is effectively prevented from falling out of the hollowed portion of the yoke 5. Furthermore, the movable base 1, the yoke 5, and the permanent magnet 4 are aligned with the surface upon which the permanent magnet 4 of the movable base 1 is exposed.

The cylindrical section 1a is formed with a key 1e to be fitted to the key slit of the transmission lever shaft at the inner wall of the cylindrical portion 1a, and formed with grooves 1h and 1i for receiving O-rings 11 and 12 at the periphery of the cylindrical section 1a. The hermetic property between the cover 2 and the cylindrical section 1a is increased by the O-ring 11 fitted into the groove 1h, and the hermetic property between the pole base 3 and the cylindrical section 1a is increased by the O-ring 12 fitted into the groove 1i.

At the lower side surface of the movable arm 1b, four arc-shaped permanent magnets 4 and the folded section 5c of the yoke 5 disposed at both ends of the permanent magnet 4 are exposed as shown in FIG. 3. Moreover, at the lower side surface of the movable arm 1b, projected sections 1f and 1g formed integrally with the movable arm 1b are projected at the periphery of the lower side shaft section 1d and the outer periphery of the movable arm 1b, respectively, as shown in FIG. 1. Each end of the projected sections 1f and 1g is formed with a semicircular-shaped section, thereby enabling an easily slidable operation on the bottom surface 3d of the pole base 3 upon rotation of the movable base 1.

The cover 2 has a shaft hole 2a to be fitted to the upper side shaft section 1c, and a ring-shaped projection 2b to be fitted to a coupling groove 3b formed on the lower peripheral surface of the pole base 3. The cover 2 and the pole base 3 are made of a resin material having oil-proof and heat resistance properties, and to which an ultrasonic welding can be applied easily. Such resin material may be nylon resins, polypropylene or the like. The cover 2 may be fitted to the pole base 3 through the movable base 1 and the substrate 6, and then the coupled portion between the coupled groove 3b and the ring-shaped projection 2b is welded to achieve a hermetic seal by using ultrasonic welding or vibration welding.

Figure 6:
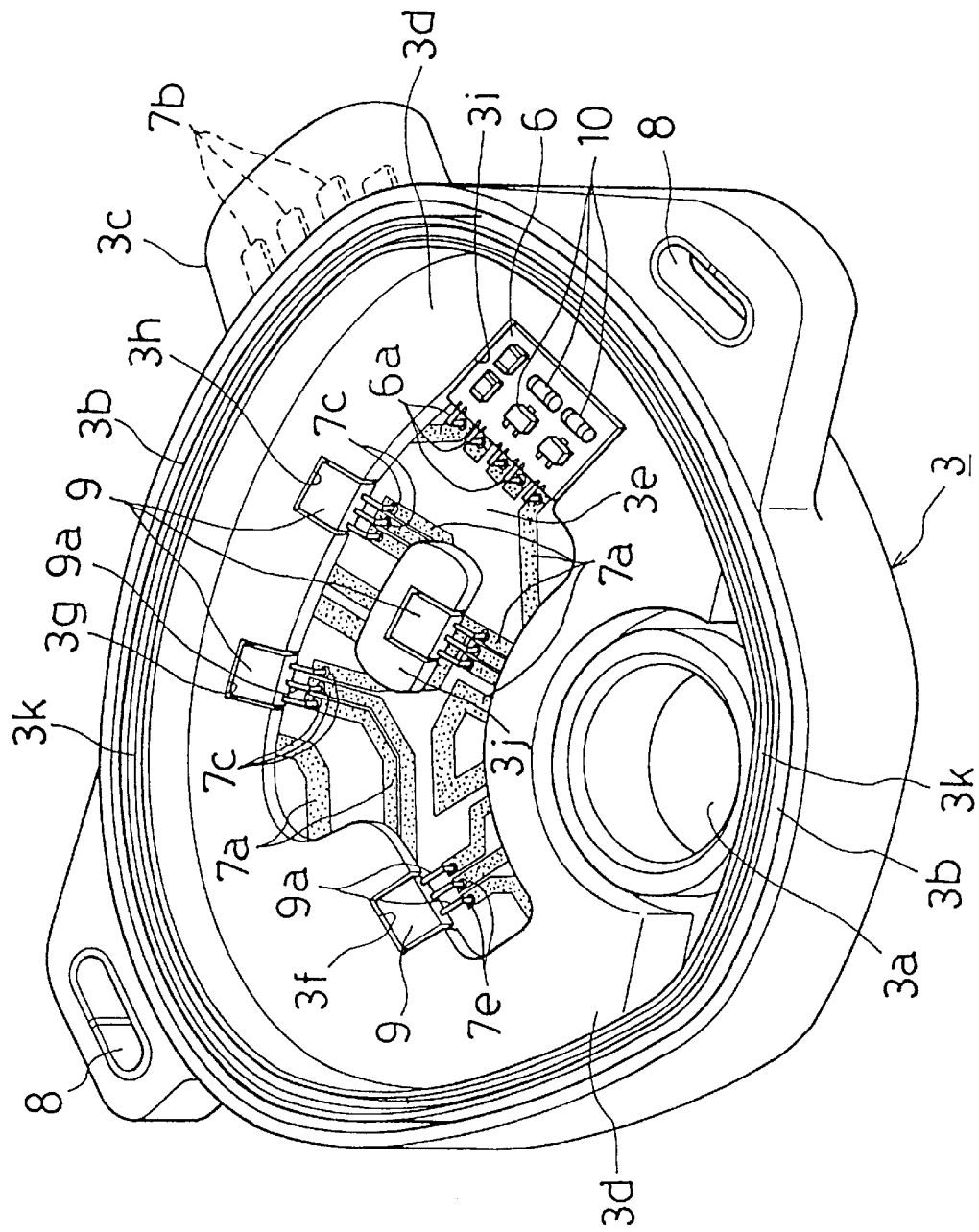
FIG. 6 is an enlarged perspective view showing a pole base of the inhibitor switch according to the preferred embodiment of the present invention.
Figure 7:
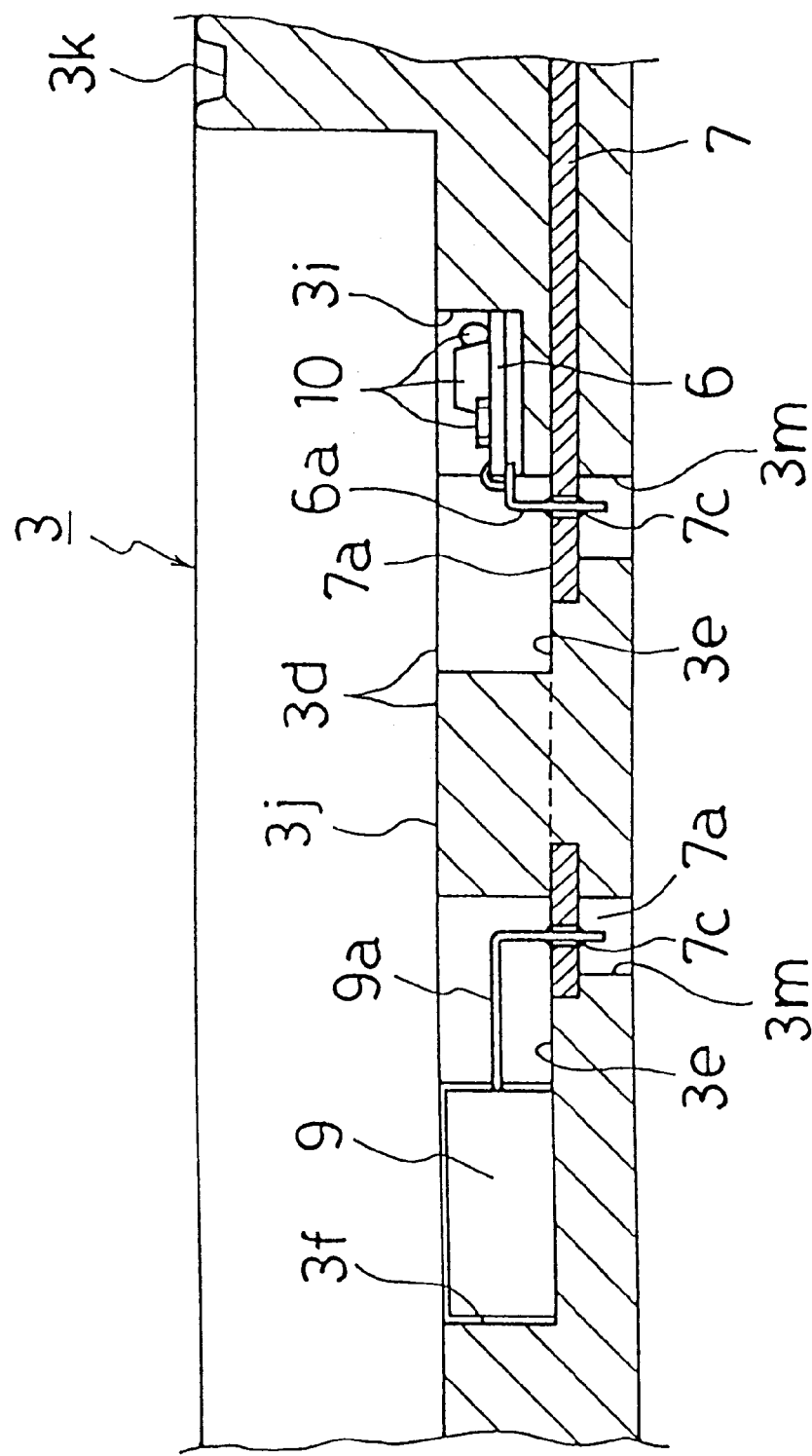
FIG. 7 is an enlarged sectional view showing a main portion of a magnetic sensor in its mounted state according to the preferred embodiment of the present invention.

The pole base 3 is formed so that a conductive body 7 and metallic rings 8 are inserted therein, and may be fixed by using screws passing through the metallic rings 8, respectively, to the outer side of the automatic transmission body. As shown in FIG. 6, the conductive body 7 has a body section 7a provided with through holes 7c, and is exposed on an offset surface 3e which is recessed from the bottom surface 3d of the pole base 3. Terminals 7b are adapted to be projected into a connector section 3c.

On the offset surface 3e, there are provided notch slits 3f, 3g, and 3h for supporting magnetic sensors 9, respectively, at the periphery portion thereof, and a notch slit 3i for supporting the substrate 6 having electronic elements 10 loaded thereon. A guide 3j for supporting one of the magnetic sensors 9 is also formed within the offset surface 3e. The upper surface of the magnetic sensor 9 and the electronic elements 10 are aligned in the same level as that of the bottom surface 3d of the pole base 3, or aligned in a lower level than that of the bottom surface 3d, by folding the lead terminals 6a and 9a. In the pole base 3, there are provided a cavity 3m for disposing the lead terminals 6a and 9a at the lower side of the through holes 7c of the conductive body 7, and a groove 3k for receiving a packing 13 on the contact surface between the periphery of the bottom surface 3d receiving the movable base 1 and the cover 2.

Figure 4:
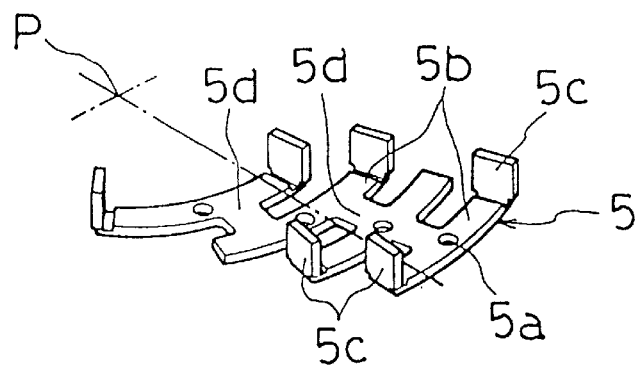
FIG. 4 is an enlarged perspective view showing a yoke of the inhibitor switch.
Figure 5:
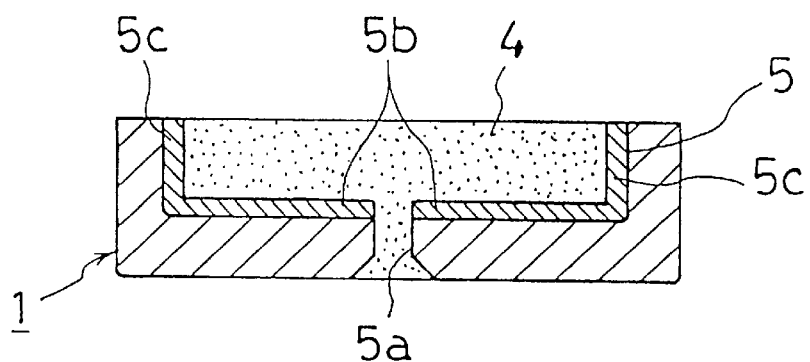
FIG. 5 is an enlarged sectional view taken along the line 5—5 in FIG. 3.

As shown in FIG. 5, the yoke 5 is a molded frame for receiving the permanent magnets 4, which are formed with magnetic material by using the injection-molding method. The yoke 5 has the bottom pieces 5b as the bottom of the hollowed portion when the permanent magnet 4 is inserted into the movable base 1 as the primary molded product during the injection molding operation. As shown in FIG. 4, the yoke 5 has the folded section 5c exposed to the surface of the movable base 1, the bottom pieces 5b forming the hollowed portion for receiving the permanent magnets 4, respectively, and the gate holes 5a. The yoke 5 forms plural bottom pieces 5b integrally connected with each other, and the folded section 5c for forming the hollowed portion at the end portion of each of the bottom pieces 5b. Each of the bottom pieces 5b is made as an arc-shaped piece having a radius of curvature centered at the center point P of the cylindrical section 1a.

Figure 2:
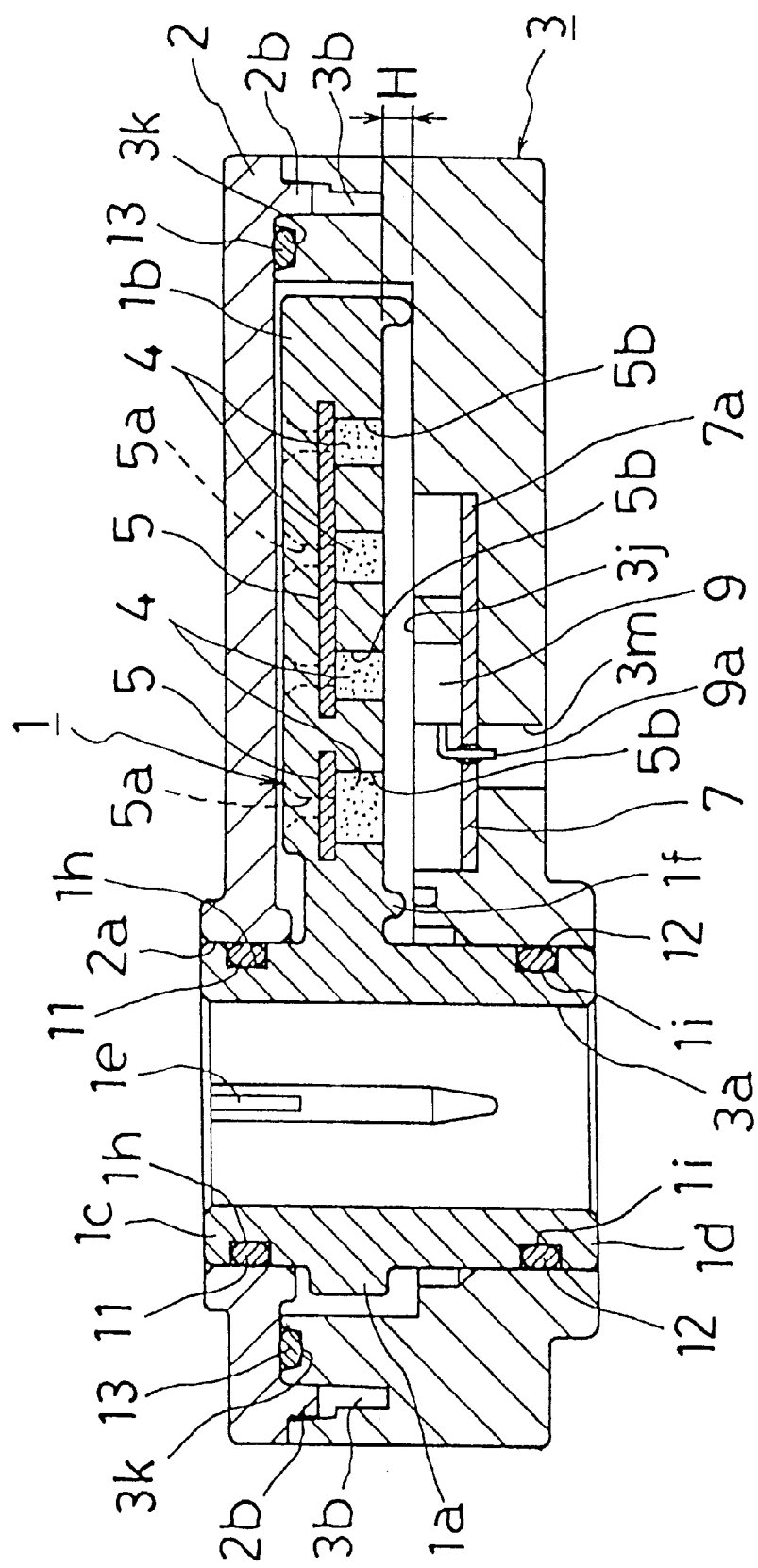
FIG. 2 is an enlarged sectional view of a center portion of the inhibitor switch according to the preferred embodiment of the present invention.

In the case where the substrate 6 and the magnetic sensor 9 are mounted on the pole base 3, the lead terminals 6a and 9a are first fixed by using solder by fitting the one end of conductive body 7 with the through holes 7b in a vertical state. Then, the lead terminals 6a and 9a of the substrate 6 and the magnetic sensors 9 are folded at a right angle and then inserted into the notches 3f and 3h, respectively, in a lateral orientation state. The magnetic sensors 9 may be Hall-effect devices, Hall ICs, MR elements or the like for detecting magnetic flux. The magnetic sensors 9 and the notches 3f, 3g, and 3h for receiving the magnetic sensors 9, respectively, are mounted suitably in accordance with the permanent magnets 4, which are rotated in accordance with the transmission position of the automatic transmission device. The magnetic sensors 9 are disposed so that upper surfaces of the magnetic sensors are approximately flush with the bottom surface 3d of the pole base 3 and do not contact with the movable base 1, as shown in FIG. 2. The gap H between the magnetic sensors 9 and the permanent magnets 4 may be about 0.1 mm to 0.6 mm.

The operation of the embodiment of the present invention constructed as mentioned above will now be described in detail. When a driver operates the shift lever, the transmission operating position of the automatic transmission device for automobiles is changed. At that time, the movable base 1 received within the inhibitor switch is rotated around the cylindrical section 1a in accordance with the movement of the shift lever, and the permanent magnet 4 is also moved in accordance with it. The magnetic sensors 9 of the substrate 6 mounted at the positions adjacent to the movable base 1 detect the transmission operating position in response to the change of the magnetic flux due to the movement of the permanent magnets 4.

The present invention thus constructed has the following novel features and improved effects.

According to the invention, an inhibitor switch is provided comprising a movable base provided with permanent magnets and adapted to be rotated in accordance with the transmission operating position of an automatic transmission device, magnetic sensors for detecting the magnetic flux from permanent magnets, a pole base rotatably supporting the movable base, and a cover for rotatably supporting the movable base. The inhibitor switch is characterized in that a conductive body composed of terminals projected into a connector section and a body section connected to the magnetic sensors mounted within the pole base, is mounted on the bottom surface of the pole base, and the conductive body is inserted into the pole base by using an insert molding method. Thus, it is possible to mount the magnetic sensors on the pole base directly, and further reduce the number of parts, man-hours for assembly and cost of the inhibitor switch.

According to another aspect of the invention, an inhibitor switch is provided wherein the pole base has an offset surface which is slightly recessed from the bottom surface, and the conductive body is inserted into the offset surface by using an insert molding method. Thus, it is possible to dispose the magnetic sensors at a position lower than the bottom surface of the pole base over which the movable base moves slidably, thereby protecting the magnetic sensors and preventing direct contact between the magnetic sensors and the movable base.

According to another aspect of the invention, the pole base is provided with notches for disposing the magnetic sensors or a substrate at the periphery of the offset surface. Thus, it is possible to hold the magnetic sensors within the notches made of nonmagnetic resin material, respectively, and prevent the inhibitor switch from any influence due to magnetic flux from the magnetic body, except the permanent magnet of the movable base, thereby maintaining a high precision of the inhibitor switch without outside interferences.

According to another aspect of the invention, the pole body is provided with a guide (3j) for disposing the magnetic sensor within the offset surface. Thus, it is possible to dispose the magnetic sensors at any desired position within the pole base.

According to still another aspect of the invention, the lead terminal of the magnetic sensor is folded, the magnetic sensors are disposed in the laterally opposite direction, and the upper surface of the magnetic sensors is approximately aligned with the bottom surface of the pole base. Thus, it is possible to maintain the distance between the magnetic sensor and the permanent magnet at a constant value, and prevent the magnetic sensor from any direct contact with the movable base as the movable base moves over the bottom surface of the pole base.

It will be appreciated that the present invention is not limited to the exact construction that has been described above and illustrated in the accompanying drawings, and that various modifications and changes can be made without departing from the scope and spirit thereof. It is intended that the scope of the invention only be limited by the appended claims.

What is claimed is:

1. An inhibitor switch, comprising:
    a movable base provided with permanent magnets, said movable base being rotatable in accordance with an operating position of an automatic transmission device;
    magnetic sensors for detecting a magnetic flux from said permanent magnets;
    a pole base and a cover which are coupled together and rotatably support said movable base, said pole base having a bottom surface and a recessed portion defined by an offset surface recessed from said bottom surface; and
    a conductive body composed of terminals projected into a connector section of said pole base and a body section, said magnetic sensors being mounted on said body section, said conductive body having an inserted portion which is, said body section of said conductive body and said magnetic sensors mounted thereon being disposed within said recessed portion of said pole base.

2. The inhibitor switch according to claim 1, wherein said pole base is provided with notches in which said magnetic sensors are disposed at an outer periphery of said recessed portion.

3. The inhibitor switch according to claim 1, wherein said pole base is provided with a notch in which a substrate is disposed at an outer periphery of said recessed portion.

4. The inhibitor switch according to claim 1, wherein said pole base is provided with a raised guide structure that positions and holds at least one of said magnetic sensors within said recessed portion.

5. The inhibitor switch according to claim 1, wherein lead terminals of said magnetic sensors are folded to project downwardly into said bottom section of said conductive body, and surfaces of said magnetic sensors facing said permanent magnet are approximately aligned with said bottom surface of the pole base.

6. An inhibitor switch, comprising:
    a movable base provided with a permanent magnet and being rotatable in accordance with an operating position of an automatic transmission device;
    a magnetic sensor for detecting a magnetic flux from said permanent magnet;
    a pole base and a cover which are coupled together and rotatably support said movable base; and
    a conductive body composed of terminals projected into a connector section of said pole base and a body section, said magnetic sensor being mounted on said body section, said conductive body having an inserted portion disposed within said pole base, said pole base having a bottom surface and a recessed portion in which said body section and said magnetic sensor are disposed, said recessed portion being defined by an offset surface recessed from said bottom surface, said magnetic sensor having a lead terminal that connects to said body section of said conductive body within said recessed portion, and said magnetic sensor having a surface facing said permanent magnet that is approximately flush with said bottom surface of the pole base.

7. The inhibitor switch according to claim 6, wherein said pole base is provided with a notch in which said magnetic sensor is disposed at an outer periphery of said recessed portion.

8. The inhibitor switch according to claim 7, wherein said pole base is provided with another notch in which a substrate is disposed at an outer periphery of said recessed portion.

9. The inhibitor switch according to claim 6, wherein said pole base is provided with a raised guide structure that positions and holds said magnetic sensor within said recessed portion.

* * * * *

UNITED STATES PATENT AND TRADEMARK OFFICE
CERTIFICATE OF CORRECTION

PATENT NO. : 6,144,272
DATED : November 7, 2000
INVENTOR(S) : Shunichi Satoh et al.

It is certified that error appears in the above-identified patent and that said Letters Patent is hereby corrected as shown below:

<u>Column 5 et seq., claim 1,</u>
Line 59, should read,
-- 1. An inhibitor switch, comprising:
a movable base provided with permanent magnets, said movable base being rotatable in accordance with an operating position of an automatic transmission device;
   magnetic sensors for detecting a magnetic flux from said permanent magnents;
a pole base and a cover which are coupled together and rotatably support said movable base, said pole base having a bottom surface and a recessed portion defined by an offset surface recessed from said bottom surface; and
   a conductive body composed of terminals projected into a connector section of said pole base and a body section, said magnetic sensors being mounted on said body section, said conductive body having an inserted portion which is insert molded into said pole base, said body section of said conductive body and said magnetic sensors mounted thereon being disposed within said recessed portion of said pole base. --

Signed and Sealed this

Fifth Day of February, 2002

*Attest:*

JAMES E. ROGAN
*Attesting Officer*  *Director of the United States Patent and Trademark Office*